United States Patent
Russell

(10) Patent No.: US 7,712,925 B2
(45) Date of Patent: May 11, 2010

(54) LED CONTROL UTILIZING DYNAMIC RESISTANCE OF LEDS

(75) Inventor: Ronald James Russell, Toronto (CA)

(73) Assignee: Remco Solid State Lighting Inc., Etobicoke, ON (CA)

( * ) Notice: Subject to any disclaimer, the term of this patent is extended or adjusted under 35 U.S.C. 154(b) by 278 days.

(21) Appl. No.: 11/573,931

(22) PCT Filed: Aug. 18, 2005

(86) PCT No.: PCT/CA2005/001255

§ 371 (c)(1),
(2), (4) Date: Feb. 19, 2007

(87) PCT Pub. No.: WO2006/017930

PCT Pub. Date: Feb. 23, 2006

(65) Prior Publication Data

US 2008/0219001 A1 Sep. 11, 2008

(30) Foreign Application Priority Data

Aug. 18, 2004 (CA) .................... 2478001
May 11, 2005 (CA) .................... 2507081

(51) Int. Cl.
*F21S 9/00* (2006.01)
(52) U.S. Cl. ................. 362/294; 362/373; 362/249.02; 362/650

(58) Field of Classification Search ................ 362/373, 362/650, 249.02, 294; 315/185 S; 327/544, 327/318
See application file for complete search history.

(56) References Cited

U.S. PATENT DOCUMENTS

| 3,787,752 | A * | 1/1974 | Delay ........................ 327/544 |
| 6,161,910 | A * | 12/2000 | Reisenauer et al. ......... 315/309 |
| 6,367,949 | B1 * | 4/2002 | Pederson ................... 362/240 |
| 6,598,998 | B2 * | 7/2003 | West et al. ................. 362/307 |
| 6,853,151 | B2 * | 2/2005 | Leong et al. ............ 315/185 R |
| 6,943,640 | B2 * | 9/2005 | Arlow ....................... 332/106 |
| 6,982,518 | B2 * | 1/2006 | Chou et al. ................... 313/46 |
| 2005/0225259 | A1 * | 10/2005 | Green ........................ 315/224 |

* cited by examiner

*Primary Examiner*—Sharon E Payne

(57) ABSTRACT

The present invention is directed to an LED light fixture. The LED light fixture comprises an interface for connecting the fixture to a source of electrical power, a power control section for supplying and controlling power to an LED array producing a light of a suitable intensity and color for the task for which the fixture is to be used and a light diffuser for diffusing the light from the LED array. The present invention is also directed to a novel power control for supplying and controlling power to an LED array comprising a non switching linear design based on a monolithic approach of power control whereby the load (the LED array) becomes part of the power control system.

14 Claims, 20 Drawing Sheets

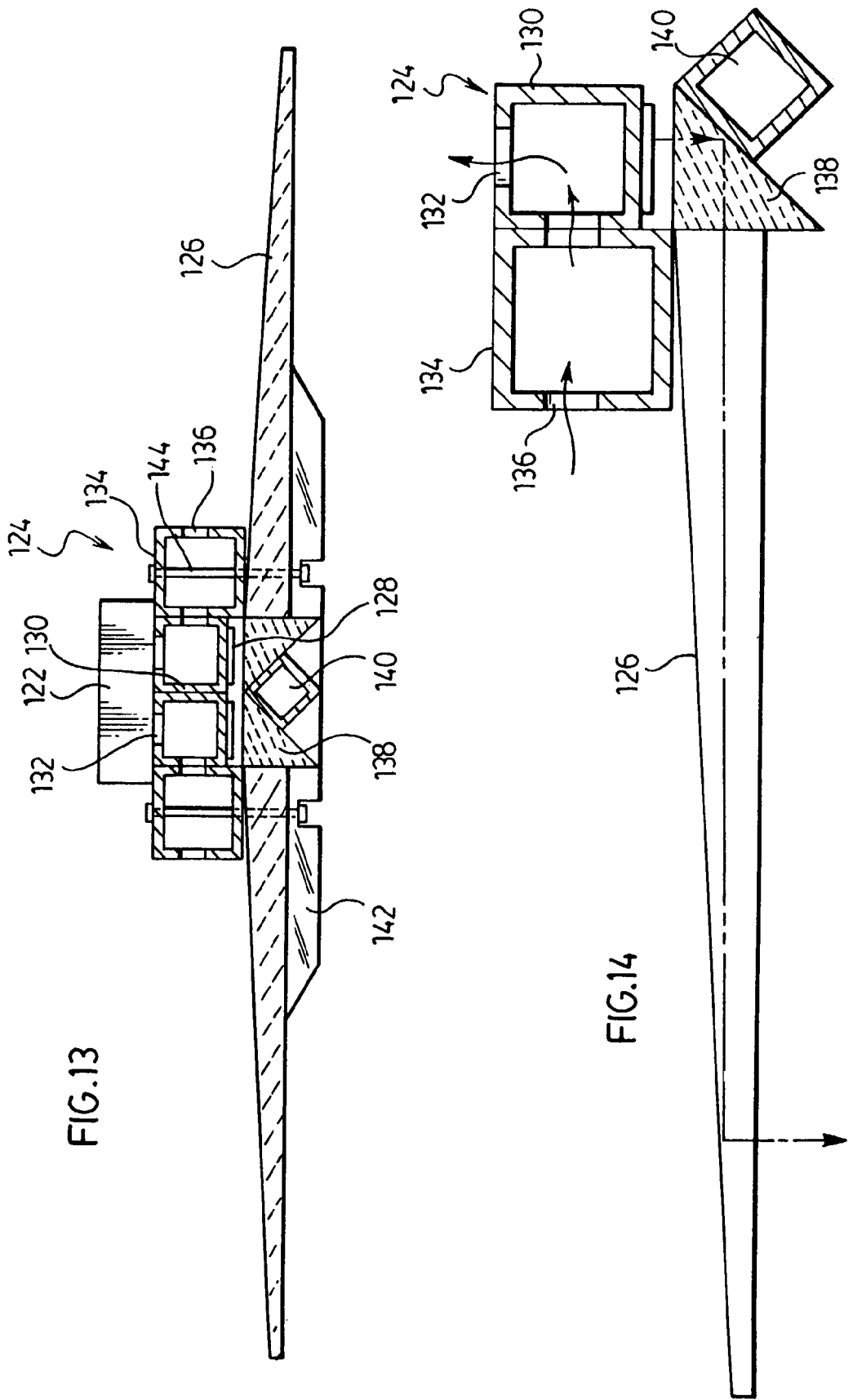

LED CONTROL UTILIZING DYNAMIC RESISTANCE OF LEDS

FIELD OF THE INVENTION

The present invention relates to LED light fixtures used to replace existing lighting, especially residential and commercial fixtures. In particular, the present invention relates to an LED light fixture where the LED bulbs are part of the control system for controlling the power of the LED light fixture.

BACKGROUND OF THE INVENTION

A common lighting source used in residential and commercial lighting is incandescent light bulbs that produce light using a wire filament which is heated up by the electrical current running through the filament contained within a vacuum which may also contain a mercury vapor or halogen atmosphere. Many problems exist with these light bulbs in that such bulbs fail frequently, produce large amounts of heat and use significant amounts of electricity to produce light. These disadvantages result in high maintenance costs, rises in room temperature and unnecessary energy consumption.

There have been attempts to improve the efficiency of such light bulbs such as, for example, the use of lower power fluorescent light bulbs which can be utilized in a standard incandescent light bulb screw base fixture. While such bulbs do use less power, the problem of the mercury vapor atmosphere within the bulb is still present which can create environmental problems on disposal.

In many industrial and commercial areas, another common lighting source is fluorescent light bulbs which produce light by passing electrical current through a mercury vapor atmosphere within the bulb. Such fluorescent light bulbs have the advantage that they use less power than incandescent light bulbs that produce light by heating up a wire filament as well as not producing the same amount of heat as that produced by an incandescent bulb.

However, such bulbs still have problems in that they fail frequently resulting in high maintenance costs and the mercury vapor atmosphere within the bulb can cause environmental problems on disposal.

There have also been attempts in the past to replace various types of incandescent light bulbs with LED light bulbs such as shown in U.S. Pat. No. 6,609,804. However, such LED light bulbs do not easily replace incandescent light sources, nor are they significantly more energy efficient for the same light output. In addition, there does not appear top have been attempts made to replace fluorescent light fixtures with LED light sources.

Thus, there still remains a need for a light fixture which can easily replace standard residential and commercial light fixtures but use less power, run cooler and have a longer life span.

SUMMARY OF THE INVENTION

The present invention is directed to an LED light fixture comprising an interface for connecting the fixture to a source of electrical power, an LED array producing a light of a suitable intensity and color for the task for which the fixture is to be used, a power control section for supplying and controlling power to the LED array and a light diffuser for diffusing the light from the LED array to produce suitable light for the task for which the fixture is to be used, the power control section comprising a linear non-switching power supply utilizing the LED array as the load to ballast the power supply.

The present invention is also directed to a novel power control for supplying and controlling power to an LED array comprising a non-switching linear design based on a monolithic approach of power control whereby the load (the LED array) becomes part of the power control system.

The present invention is also directed to a novel LED array using an electro thermal core for interconnection of a high density array of LEDs providing electrical interconnection and thermal collection for dispersion of the heat and an LED array producing a white light of a suitable intensity and color.

BRIEF DESCRIPTION OF THE DRAWINGS

Preferred embodiments of the present invention are shown in the drawings, wherein:

FIG. 13 is a cross-section of the LED light fixture of FIG. 9;

FIG. 14 is a cross-section of one half of the LED light fixture of FIG. 9 showing the light path and path for the cooling air;

DETAILED DESCRIPTION OF THE PREFERRED EMBODIMENTS

Figure 1:
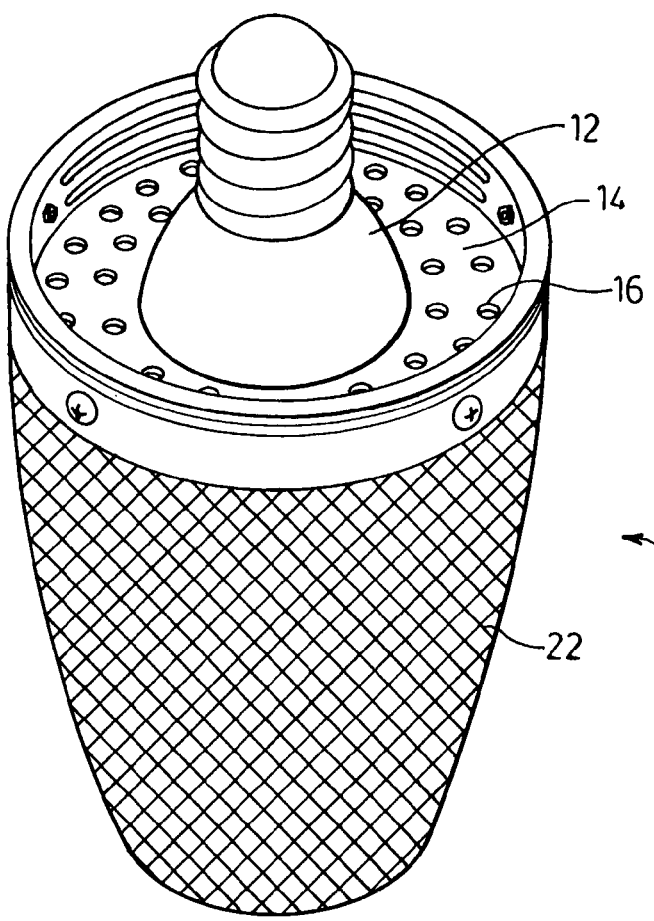
FIG. 1 is a perspective view of a first embodiment of an LED light bulb according to the present invention.
Figure 2:
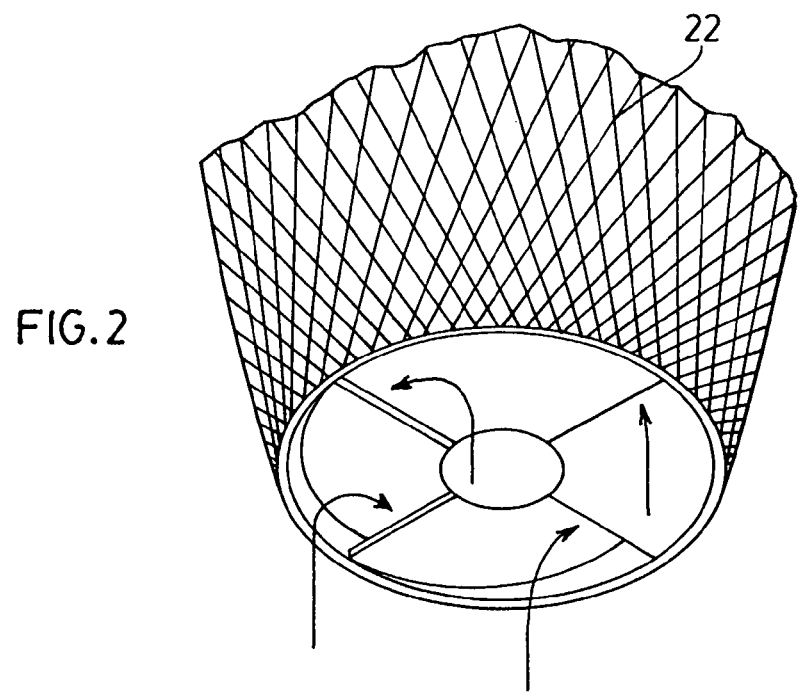
FIG. 2 is a perspective view of the bottom of the light bulb of FIG. 1.

The LED light fixture of the present invention is comprised of four major blocks—an interface, a power/control section, an electro-thermal core and an LED Array and Optics. The interface connects the LED light fixture to an electrical power source. Preferably, in one embodiment, the interface allows the LED light fixture to be a bulb to be used in existing incandescent fixtures as described below. In other embodiments, the LED light fixture replaces traditional fluorescent lighting fixtures. The power/control section is responsible for supplying and controlling power to the LED bulb array and ensures optimum light output under a wide range of ambient temperatures, as well as maximizing the life of the individual LEDs to provide for efficient dispersion of heat. The electro/thermal core section makes possible the interconnection of a very high density array of LEDs. The LED array/optics provides the desired luminous spectrum and distribution of the light from the LEDs. The structure and operation of preferred embodiments of the LED light fixture of the present invention will now be described.

A first embodiment of an LED light fixture of the present invention for use as a replacement for residential incandescent light bulbs is illustrated in FIGS. 1 to 5 generally indicated by the numeral 10. The LED light bulb 10 is provided with a screw base interface 12 which fits into the standard screw base fixtures. The screw base 12 is affixed to a thermal cap 14 containing openings 16 to allow for air flow through the bulb 10 as will be described later.

The screw base 12 also houses the power/control electronics used for powering the LED bulb array. The screw base 12 is a flanged form with a cavity space 18 that accommodates the power/control circuitry 20. An acrylic frosted diffused lens 22 covers the LED bulb array 24 and is attached to the thermal cap 14.

The electro/thermal core section 24 makes possible the interconnection of a very high density array of LEDs 26. The core 24 provides electrical interconnection, thermal collection and physical support for the LEDs 26. The heat generated in the array is dispersed by a controlled convection air flow through the thermal cap 14.

Figure 3:
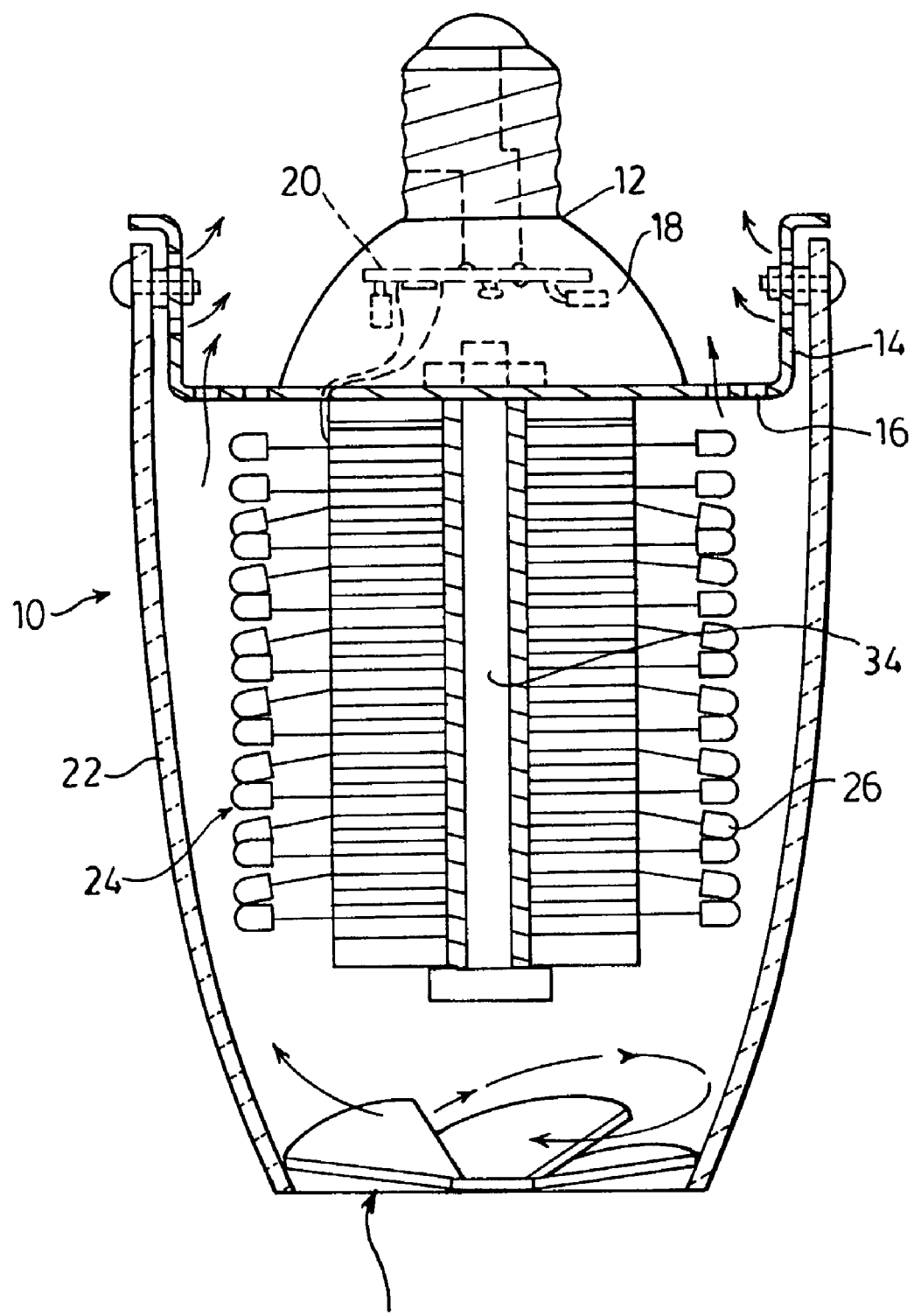
FIG. 3 is a side elevation view in cross-section of the LED bulb of FIG. 1.
Figure 4:
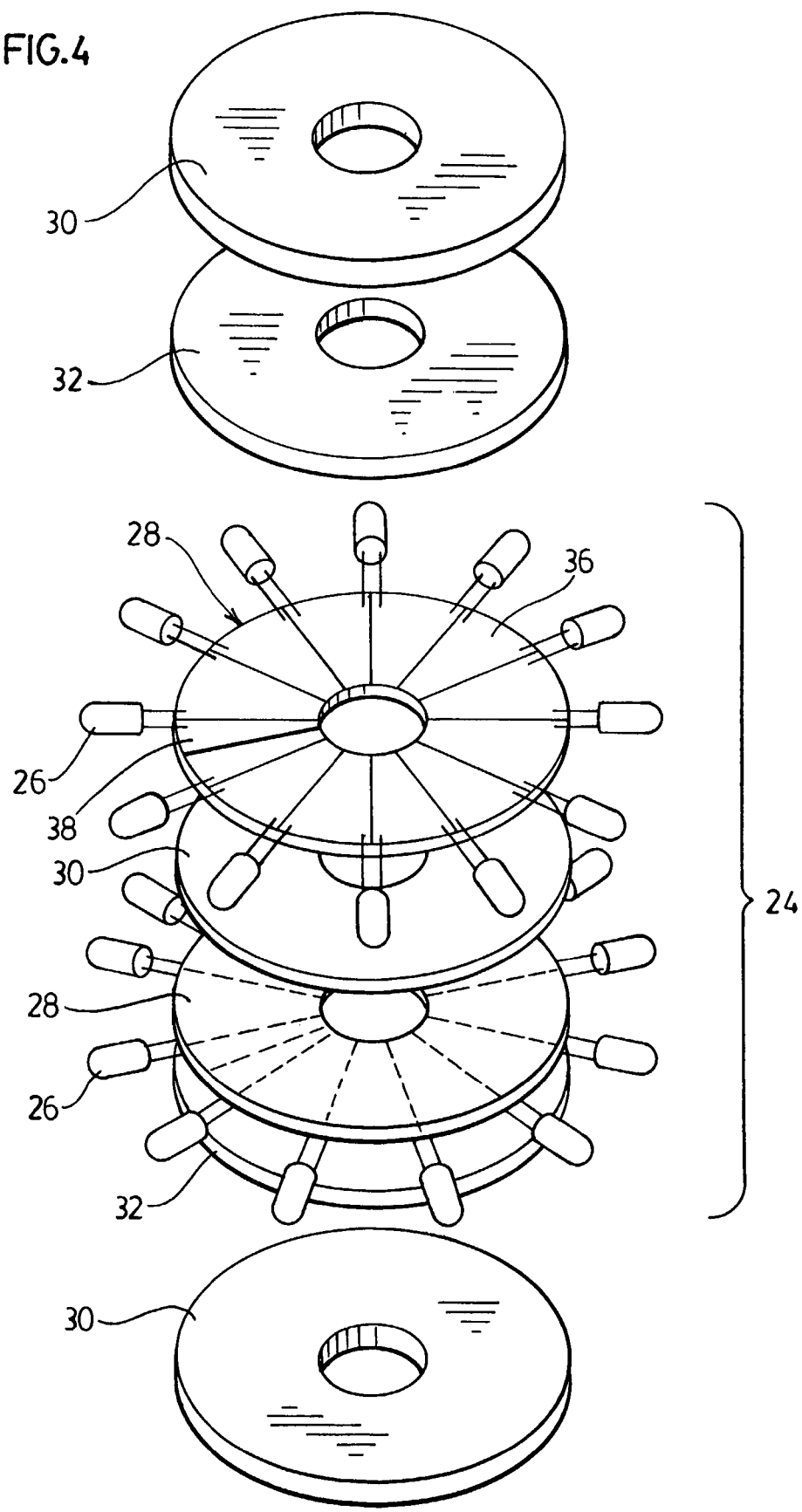
FIG. 4 is an exploded perspective view of the electro thermal core of the LED bulb of FIG. 1.
Figure 5:
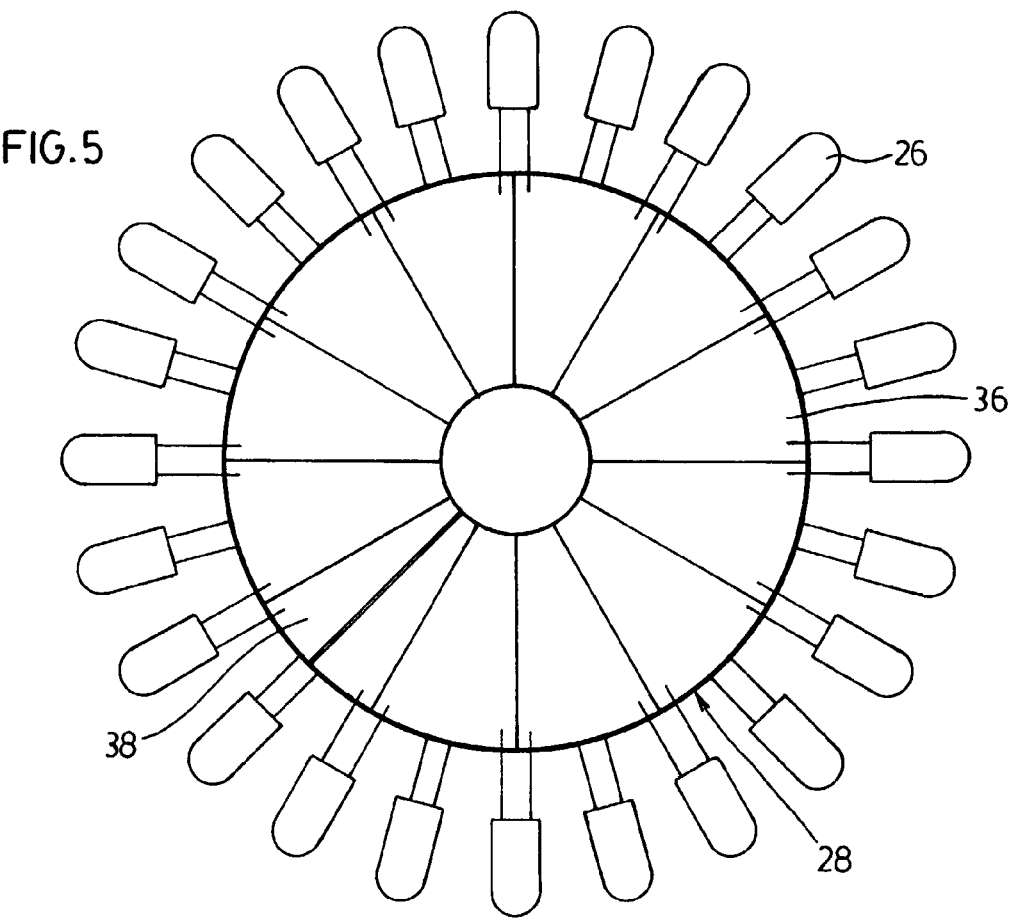
FIG. 5 is a top plan view of the electro thermal core of the LED bulb of FIG. 1.

As illustrated in FIGS. 3 to 5, in the first embodiment, the Electro-Thermal Core 24 is a segmented structure which consists of a series of disks stacked so as to form a core. There are 3 disk types: circuit disks 28, metal disks 30, and insulator disks 32. All disks types are designed to have a high thermal conductance. The disks are secured by means of a retaining rod 34 that is threaded through the center of the disk stack.

The surfaces of the disks are machined and mated so as to reduce thermal resistances between them for maximum heat transfer.

The circuit disks 28 have twelve 30 degree segments 36; one segment 38 is split and serves as the circuit interconnection point. This allows each circuit disk 28 to have twelve LED bulbs 26 connected in series. Four circuit disks 28 are connected in series to provide an LED cluster of 48 LED bulbs. To increase light output, a number of LED clusters are connected in parallel. Typically 2 to 6 such clusters are connected in parallel. To improve light diffusion, the LED clusters are interleaved and not stacked one above the other. Metal disks 30 and insulating disks 32 are placed appropriately in the stack and thermal compound is used on all mating surfaces. The stack is threaded together by an insulated retaining rod 34 and attached to the thermal cap 14. The cap 14 serves several functions and is one of the key design elements.

The constructed core is then thermally and mechanically secured to the thermal cap thereby completing the thermal circuit.

The luminous spectrum and distribution of the light from the LED array is a product of the LED type and Optic Path. Preferably two types of 5 mm LEDs are utilized to produce a white light with a CRI of 85+.

The core is covered and contained by a frosted diffuser which has two primary functions of light distribution and air flow control. The light from the individual LEDs is collated and scattered using a frosted diffuser lenses thereby evenly distributing the light in all directions. The cavity of the frosted diffuser lenses, when attached to the thermal cap, creates a venturi. Cool air enters the inlet and may pass over an optional impeller which creates a consistent uniform turbulence which in turn, increases the rate of air flow through the venturi, thereby reducing the core temperature. Hot air is then ported through the venturi outlet completing the air flow path.

Figure 6:
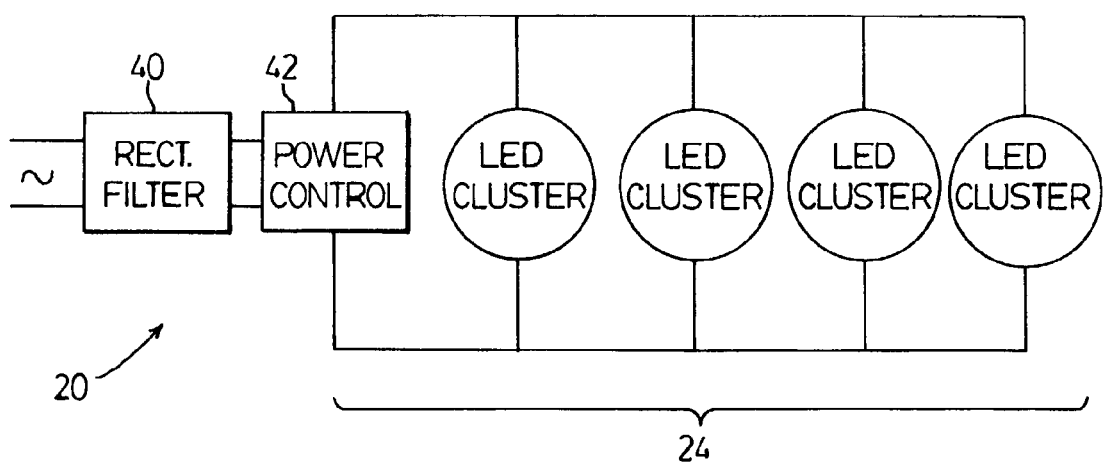
FIG. 6 is a circuit diagram of the LED bulb of FIG. 1.

The power/control section 20 is responsible for supplying an controlling power to the LED bulb array 24 and ensures optimum light output under a wide range of ambient temperatures, as well as maximizing the life of the LEDs 26. As illustrated in FIG. 6, the power/control section 20 provides rectification and filtering through a Linear DC supply having Linear Current Regulation and Optical Choke. The power/control section 20 utilizes a unique technology called an "optical ballast".

Conventional LED power controllers are based on various switching circuits that are placed in series with the LED bulb array. The switching rate and duration controls the effective power, and therefore, the heat generated. Some drawbacks to these prior arrangements include RFI/EMI-line contamination causing interference with other electronic devices, circuit complexity with high part count, additional heat generated by controller circuit which reduces efficiency and circuit life, and strobe effects.

The Optical Ballast Technology eliminates the above drawback by utilizing a non-switching linear design based on a monolithic approach of power control, whereby, the load (the LED array) becomes part of the power control system. The external portion of the controller is a Very Low Voltage (VLV) design and consumes only about 2% of the total energy required by the array. The rest of the power required for the array is trapped in the array and the LEDs are forced to work with a fixed range of power. Since the power range is fixed, the LEDs dynamic resistance becomes the power controller, and not the external controller. Thus the power required for the array includes the power required to control the array and all the power is used to produce light. By controlling the array in this way the array is almost 100% efficient since all the power is producing light and all heat produced is the result of producing light, and not generated in the controlling circuit. The result is that the power required to control the array is a portion of the total light output, hence the term "Optic Ballast". Further details of a preferred embodiment of a power/control section are described below.

It has been found that a prototype replacement for an incandescent bulb as illustrated in FIGS. 1 to 6 containing 4 LED clusters or 192 LEDs produces the equivalent light as 60 watt incandescent bulb while consuming about 20 watts or ⅓ the power of an 60 Watt incandescent bulb resulting in about 66% Power Savings. The operating temperature of the bulb was 125 deg. F., 35 deg. lower than a 60 watt bulb. The expected life expectancy of the LED bulb is 20+ Years in continuous use.

In the first preferred embodiment, as described above, the LED light bulb 10 is designed to replace an existing 120 vol incandescent light bulb and. By changing the interface, the bulb may be used in other types of fixtures as well as for other applications.

For example, the LED light bulb of the present invention as described above, may also be used to replace other types of light sources, such as fluorescent lights. An lay in panel, similar to existing fluorescent fixtures may be provided with a number of receptacles for a screw base. Generally anywhere from 4 to 8 such receptacles are provided depending upon the desired light output. The receptacles are wired to a junction box for connection to the electrical wires from the supply.

Figure 7:
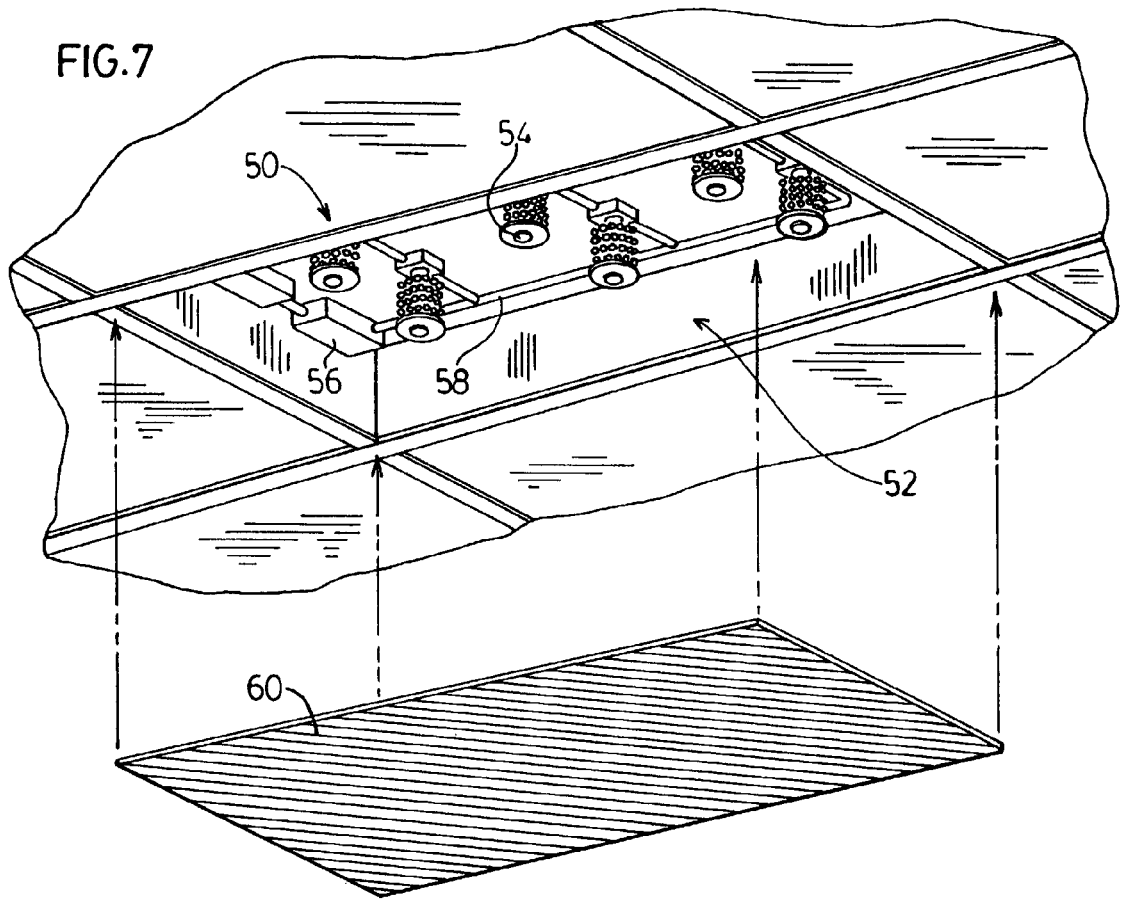
FIG. 7 is a perspective view of an embodiment of the LED light bulb of FIG. 1 in a ceiling panel fixture.

Alternatively, as illustrated in FIG. 7, a replacement lay in panel 50 may be provided to replace existing fluorescent lay in panels. The panel 50 is provided with a recess 52 containing the LED light bulbs 54. The interface is a junction box 56 which allows direct connection to the wiring in a conventional manner. The power/control circuitry may be contained within the junction box 56 and the output wires 58 of the power/control section lead to connectors for the LED arrays. A frosted diffuser panel 60 is provided to collate and scatter the light from the LED arrays thereby evenly distributing the light in all directions.

Figure 8:
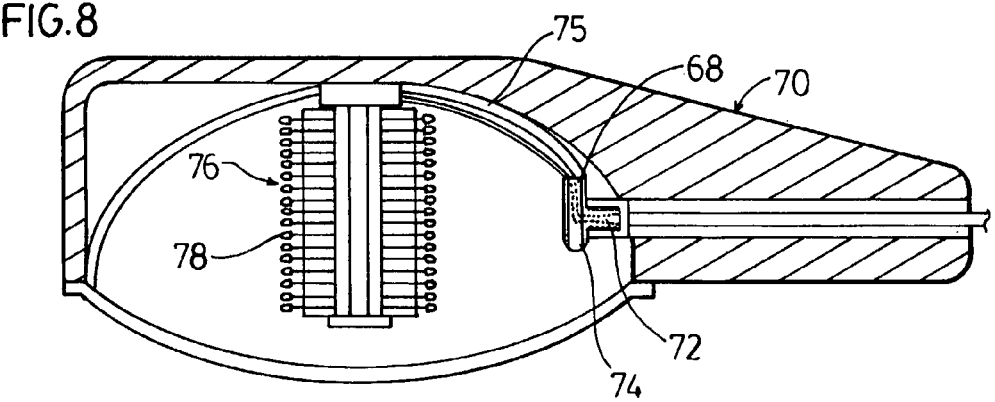
FIG. 8 is a side elevation view partly in cross section of a second embodiment of an LED light bulb of the present invention in a street lamp fixture.
Figure 9:
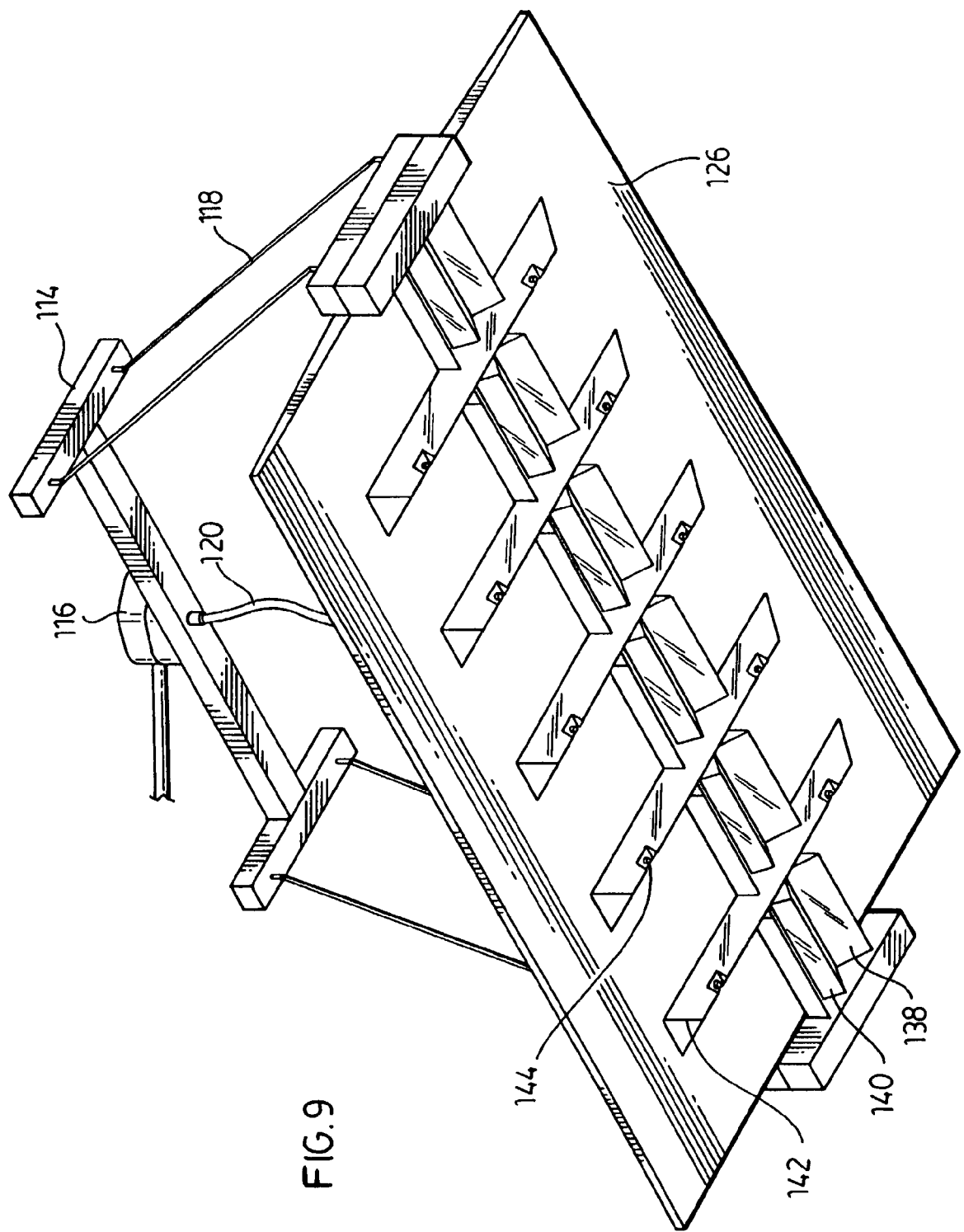
FIG. 9 is a perspective view of a third embodiment of an LED light fixture according to the present invention.
Figure 10:
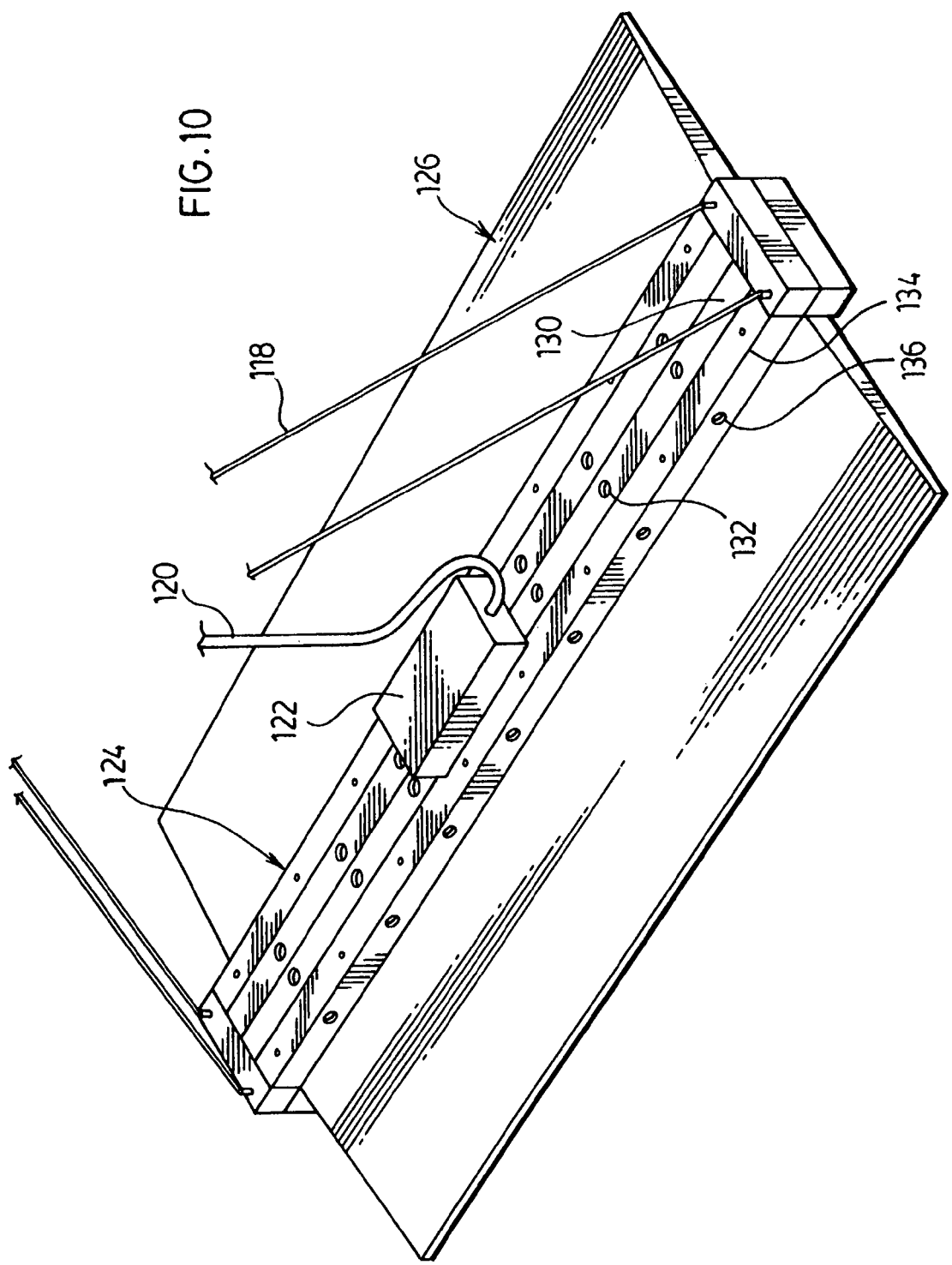
FIG. 10 is a perspective view of the top of the LED light fixture of FIG. 9.
Figure 11:
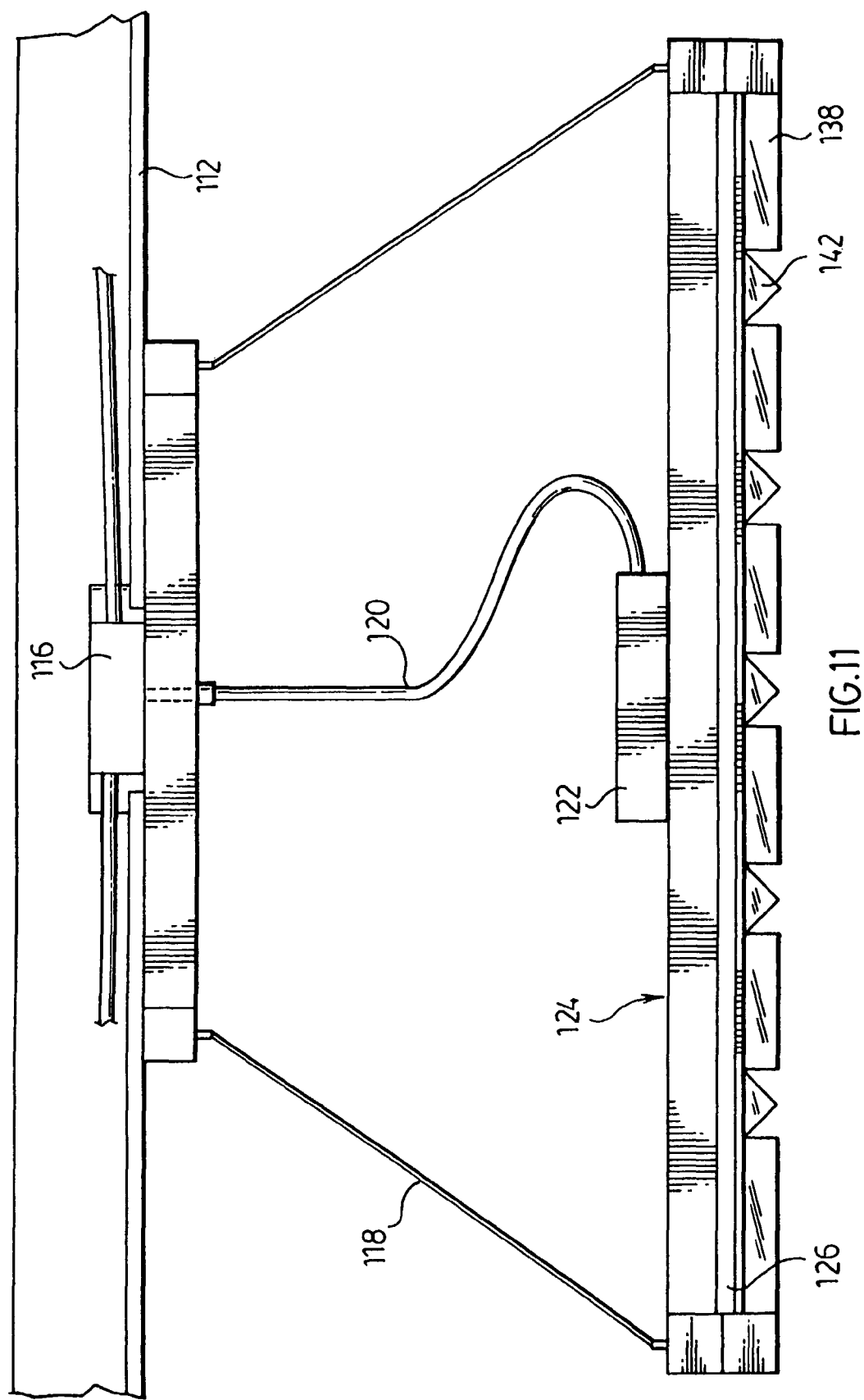
FIG. 11 is a side elevation view of the light fixture of FIG. 9.

A second embodiment of an LED light bulb 68 of the present invention is illustrated in FIG. 8 for use as a street light in a typical cobra head street light head 70. The light bulb 68 is provided with a screw base interface 72 which allows it to be connected to the light head 70. Similar to the first embodiment, the power/control section 70 is contained within the screw base 72. The electro/thermal core and LED array are mounted in the top of the cobra head and connected to the power/control section 74 in the screw base 72 by wires 75. The electro/thermal core 76 contains the high density array of LEDs 78 arranged similar to the first embodiment. The LEDs 78 are arranged in 8 clusters of 48 LEDs in each cluster. The core is constructed similar to the first embodiment with circuit disks, metal disks and insulator disks. As the cobra head 70 is provided with a diffuser cover 80, a separate diffuser for the LED light bulb 68 is not required.

A third embodiment of the LED light fixture of the present invention for use in replacement of fluorescent light fixtures as illustrated in FIGS. 9 to 14 generally indicated by the numeral 110. The LED light fixture 110 illustrated in the figures is adapted to be suspended from a ceiling 112. A mounting bracket 114 such as that illustrated in the figures is attached to the ceiling 112 over the electrical outlet box 116. The light fixture 110 is suspended from the bracket 114 through the use of suitable suspension guy wires 118 and is connected to the electrical box 116 by wire 120. Wire 120 is in turn connected to a control box 122 which contains the power control circuitry for supplying and controlling the power to the LED array assembly 124, the details of which will be described further below. The light from the LED array 124 passes through a diffuser system 126 to provide for even and uniform light output from the light fixture.

Figure 12:
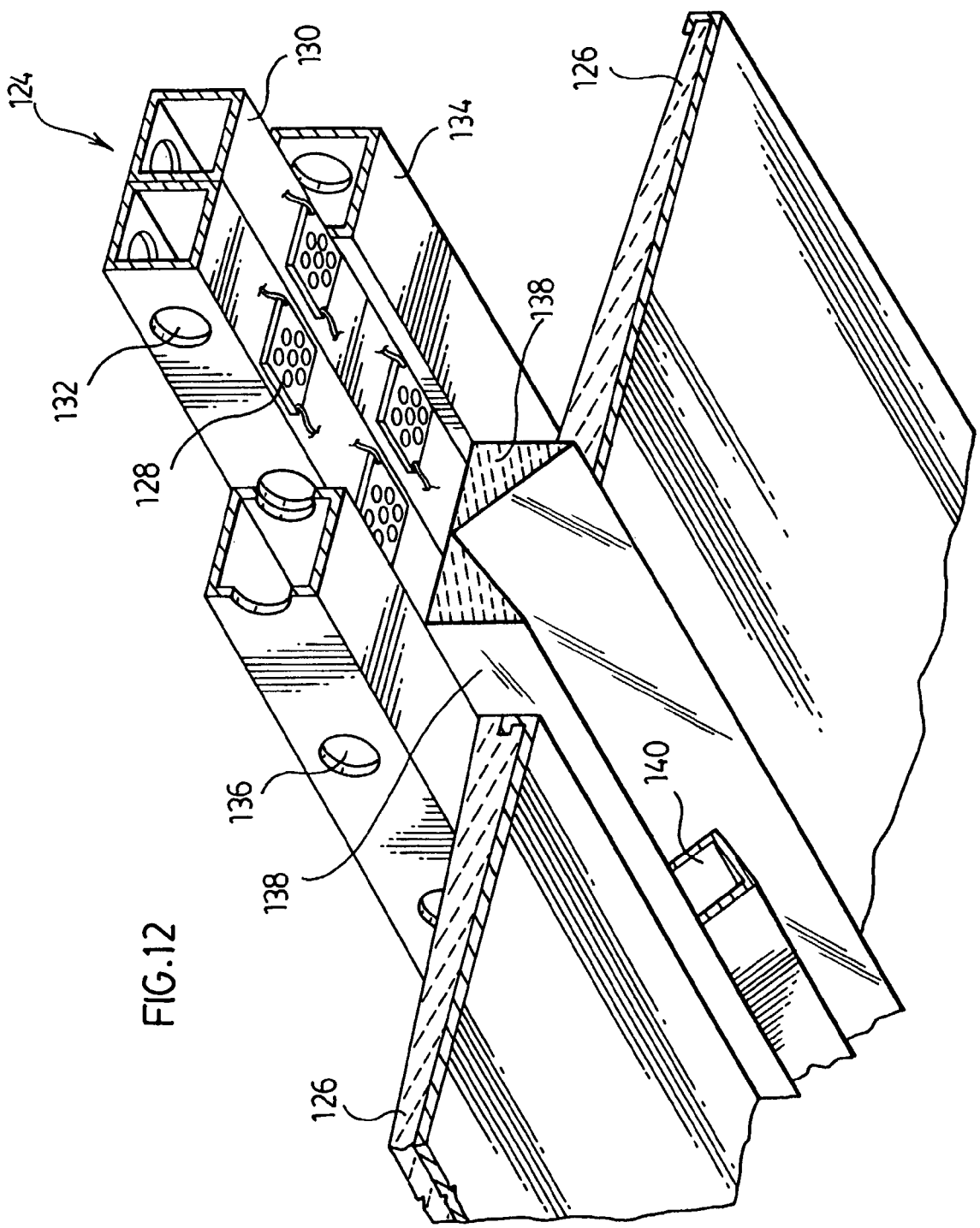
FIG. 12 is a perspective view in section of the LED light fixture of FIG. 9.

The details of the light components of this embodiment are illustrated in detail in FIGS. 12 through 14. The embodiment illustrated utilizes a chip based LED array 128. These chips are provided with about 42 LED's per each chip and the light illustrated in the figures utilizes 14 such chips per side. The LED light array utilizes two parallel rows of LED's 128 each independently fed and controlled by the control section. The LED chips 128 are mounted on a thermal core heat sink 130 which allows for the heat generated by the LED's 128 to be dissipated into the atmosphere. The version of the heat sink 130 utilized in the embodiment illustrated is a metal tube 130 to which the LED chips 128 have been attached. The hollow metal tube 130 is provided with openings 132 along the top and sides thereof to allow for air flow through the tube 130 to aid in heat dissipation. A further pair of tubes 134 outboard of the tubes 130 to which the LED chips 128 are mounted are provided to allow for attachment of the other optical components. These tubes 134 are also provided with holes 136 which align with the holes 132 in the tubes of the heat sinks 130 to allow for the proper air flow as is illustrated in detail in FIG. 14.

In the fixture 110 illustrated in FIGS. 9 to 14, the light from the LED 128 is directed downwardly into a prism 138 which reflects the light into the diffuser system 126. In the embodiment illustrated, the diffuser system 126 is a wave guide which provides for diffusion of the light from the LED 128 along the entire surface of the wave guide. The prisms 138 are held in place by a mounting tube 140 and the entire assembly is connected by cross bridges 142. In the embodiment illustrated, the cross bridges 142 are further lengths of prism to provide for an esthetically pleasing appearance to the light fixture. The whole assembly is bolted together using bolts 144.

Figure 15:
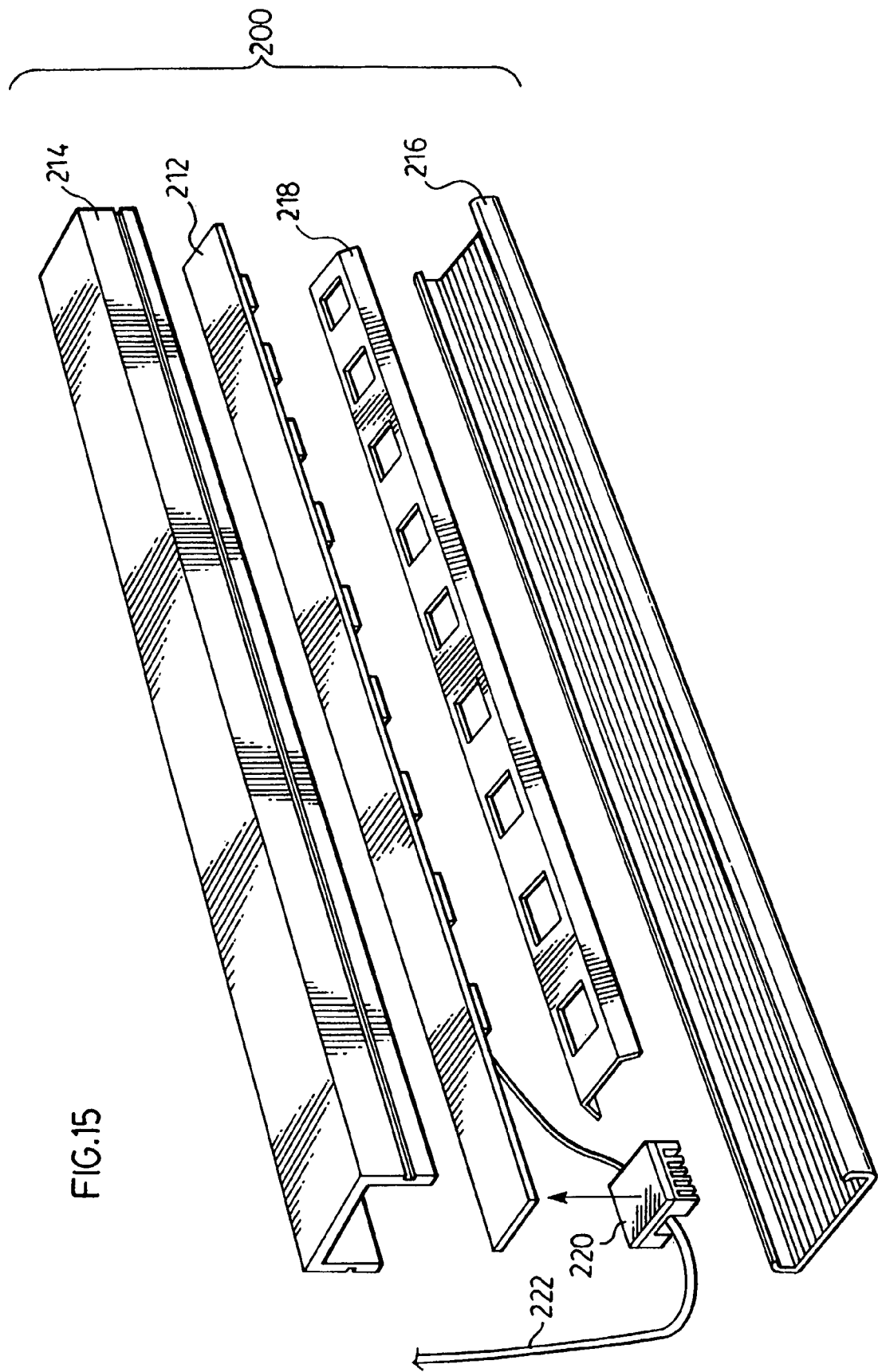
FIG. 15 is an exploded perspective view of a fourth embodiment of an LED light fixture of the present invention.

A fourth embodiment of a LED light fixture of the present invention is illustrated in FIG. 15 generally indicated by the numeral 200. This light fixture is provided with an LED array 212 mounted within a housing 214. A diffuser 216 is provided to attach to the housing 214 and hold the components within the housing 214. In order to space the LED array 212 from the diffuser 216, a spacer strip 218 is provided which allows for air flow for cooling of the LED array 212. The LED's are powered by a power/control component 220 connected to an electrical source by wire 222. The embodiment of the invention illustrated in FIG. 15 is particularly useful for strip lighting or replacing fixtures having a single fluorescent tube.

This embodiment of the LED light fixture of the present invention is of particular use for grow bulbs for use in greenhouses and other such applications. These grow bulbs provide for photosynthetic active radiation (PAR) which typically is light in the wave length range 400 to 525 nm, 610 to 720 nm. These wave lengths can be duplicated in the light fixture of the present invention by utilizing suitable red and blue LED emitting light at the desired wave lengths.

Figure 16:
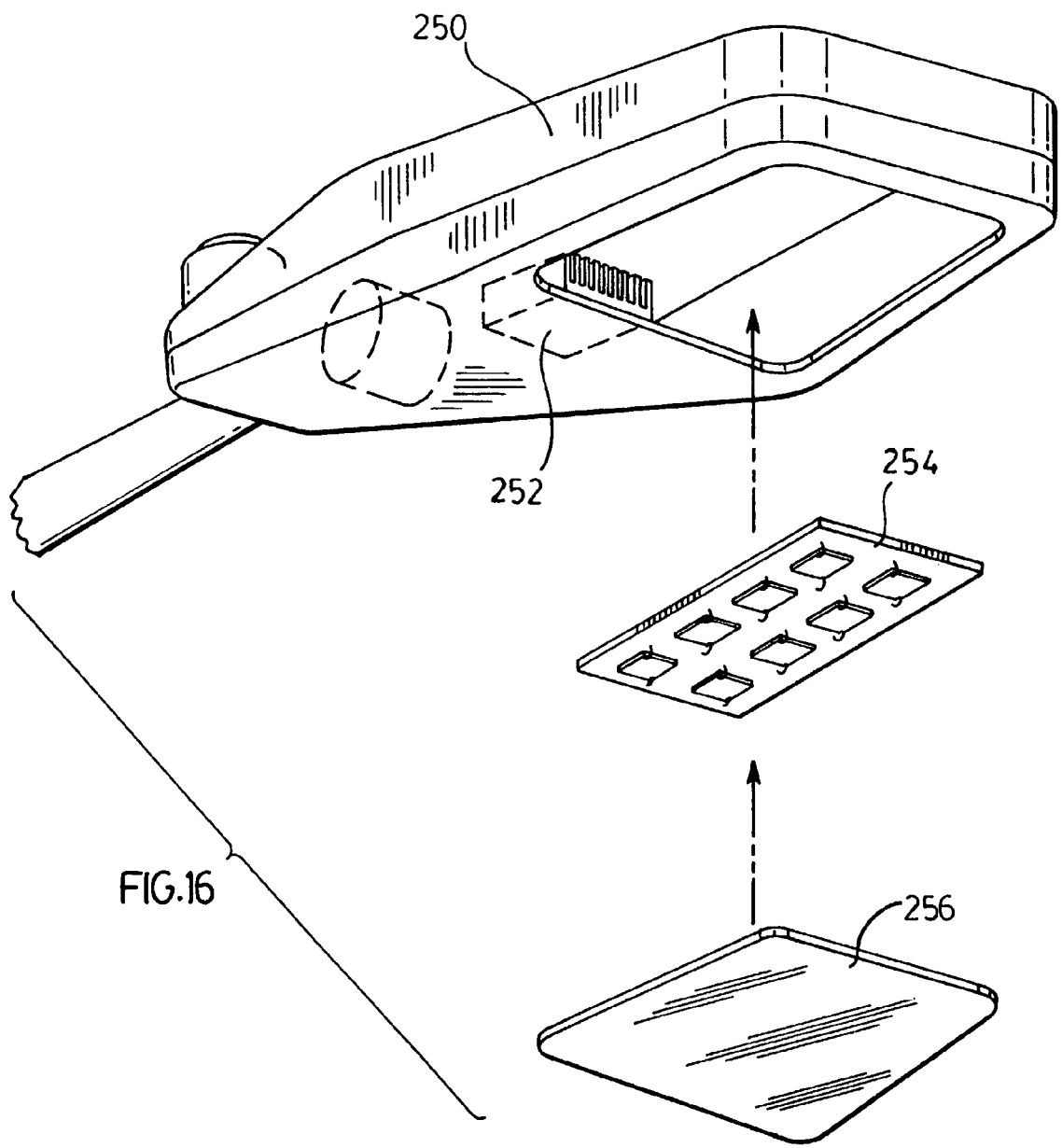
FIG. 16 is an exploded perspective view of a fifth embodiment of a light fixture of the present invention.

A fifth embodiment of an LED light fixture of the present invention is illustrated in FIG. 16. This embodiment is for use as a street light in a typical cobra head street light head 250. The cobra head is provided with control circuitry 252 and an LED light array 254 for mounting within the cobra head. A diffuser panel 256 is provided to diffuse the light generated by the LED array.

Figure 17:
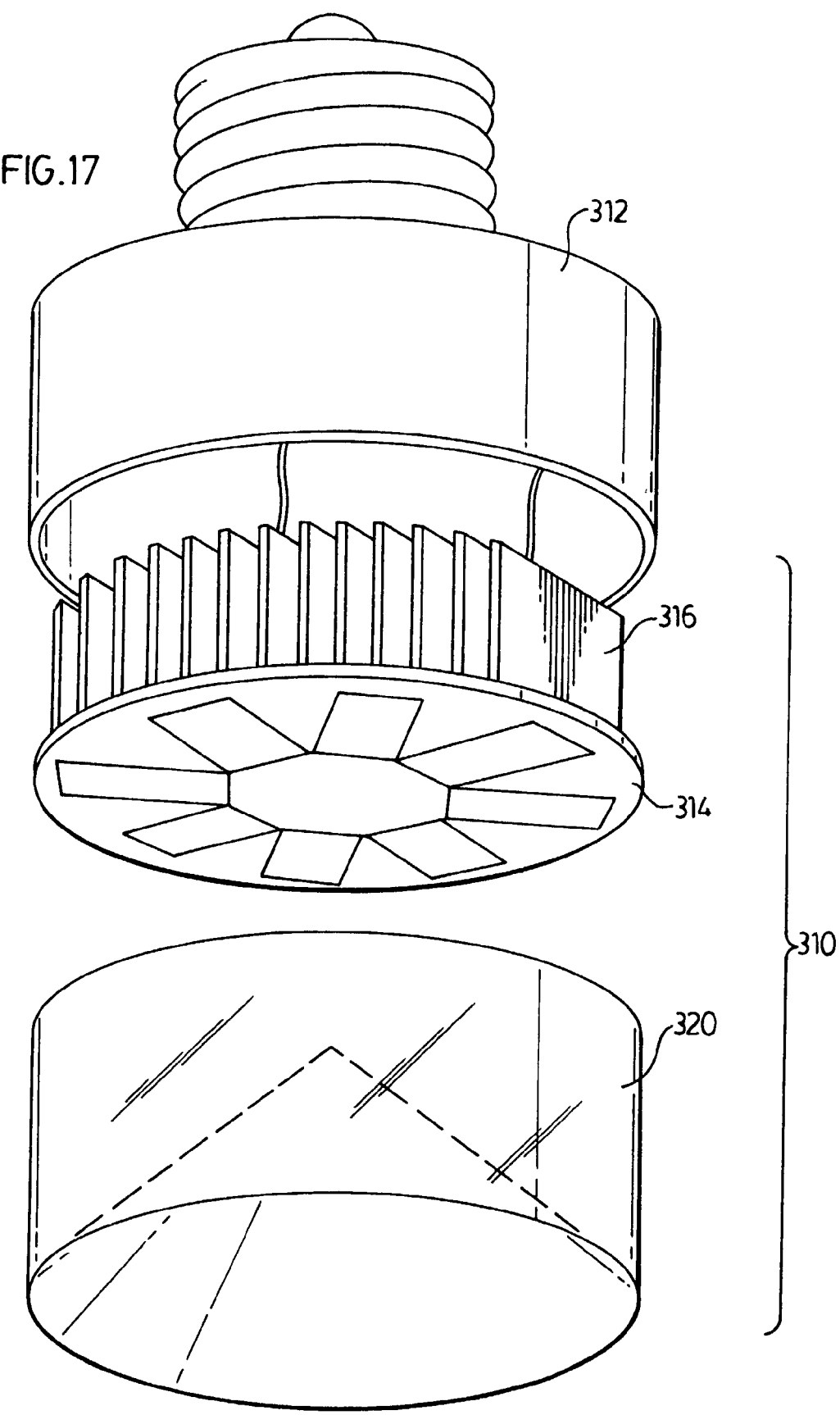
FIG. 17 is an exploded perspective view of a sixth embodiment of a light fixture of the present invention.
Figure 18:
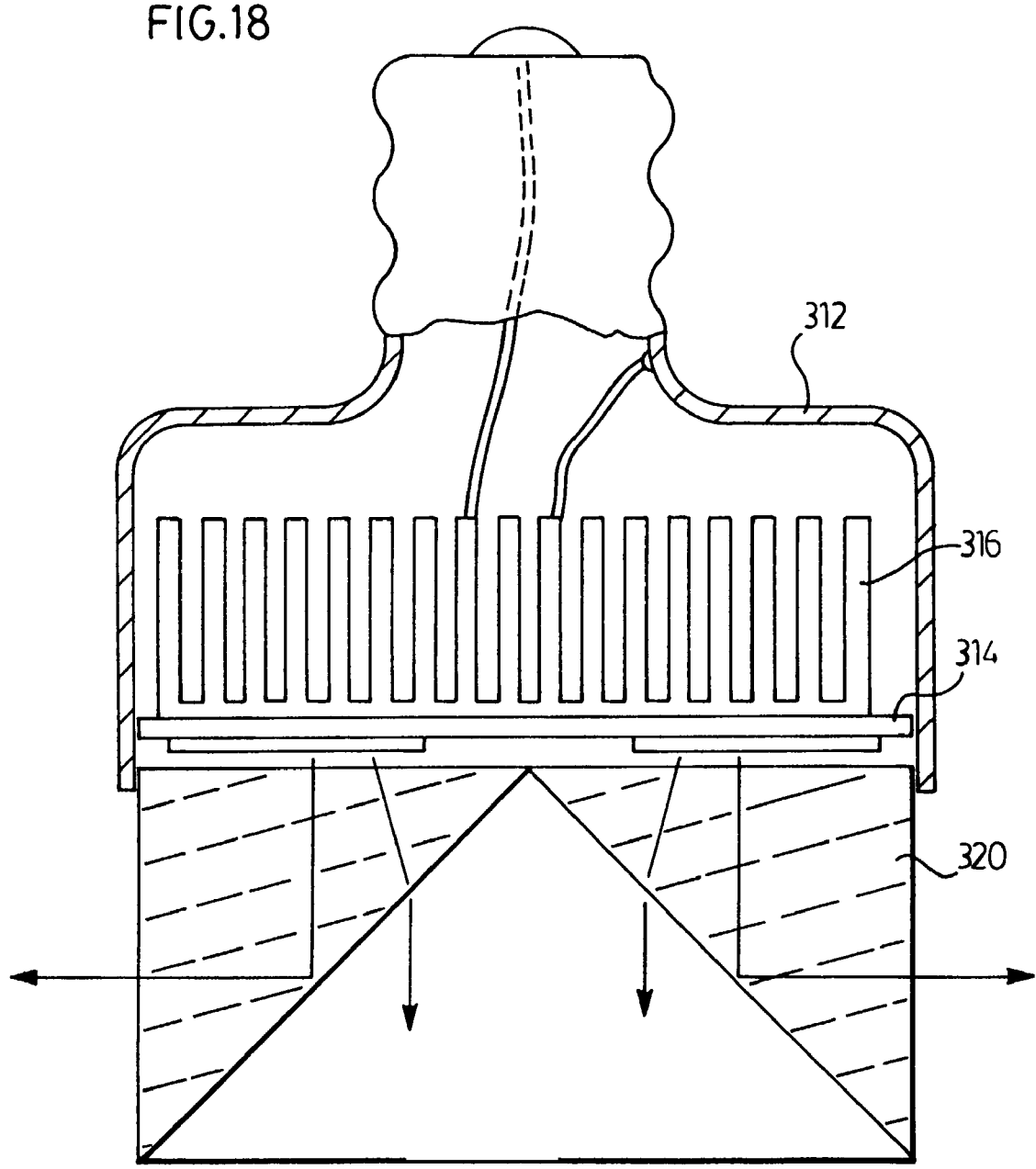
FIG. 18 is a side elevation view in cross section of the light fixture of FIG. 16.

A sixth embodiment of a light fixture according to the present invention for use in replacing incandescent light bulbs is illustrated in FIGS. 17 and 18 generally indicated by the numeral 310. The LED light bulb 310 is provided with a screw base interface 312 that fits into the standard screw fixtures. The light bulb 310 is provided with a LED light array 314 and heat sink 316 connected to an electrical source through the power control section. The LED array 314 and heat sink 316 is contained within the cavity of the screw base fixture 312. Overlaying the LED array 314 is an optical diffuser 320 which allows some of the light from the LED light array 314 to pass straight there through while deflecting other portions of the light sideways to provide for good overall illumination of the space lighted by the light fixture 310.

Figure 19:
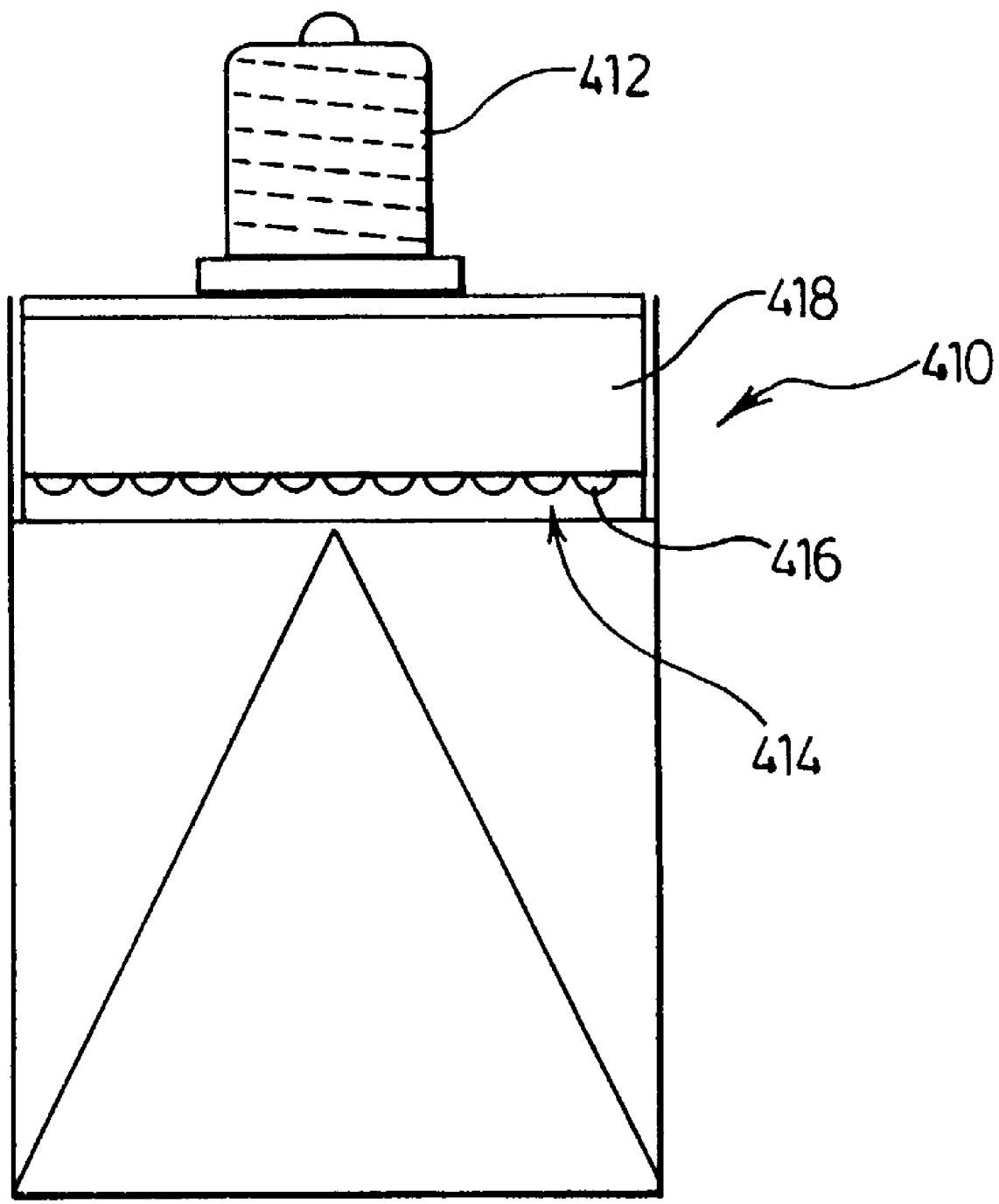
FIG. 19 is a side elevation view in cross section of a variation of a light fixture of FIG. 16.
Figure 20:
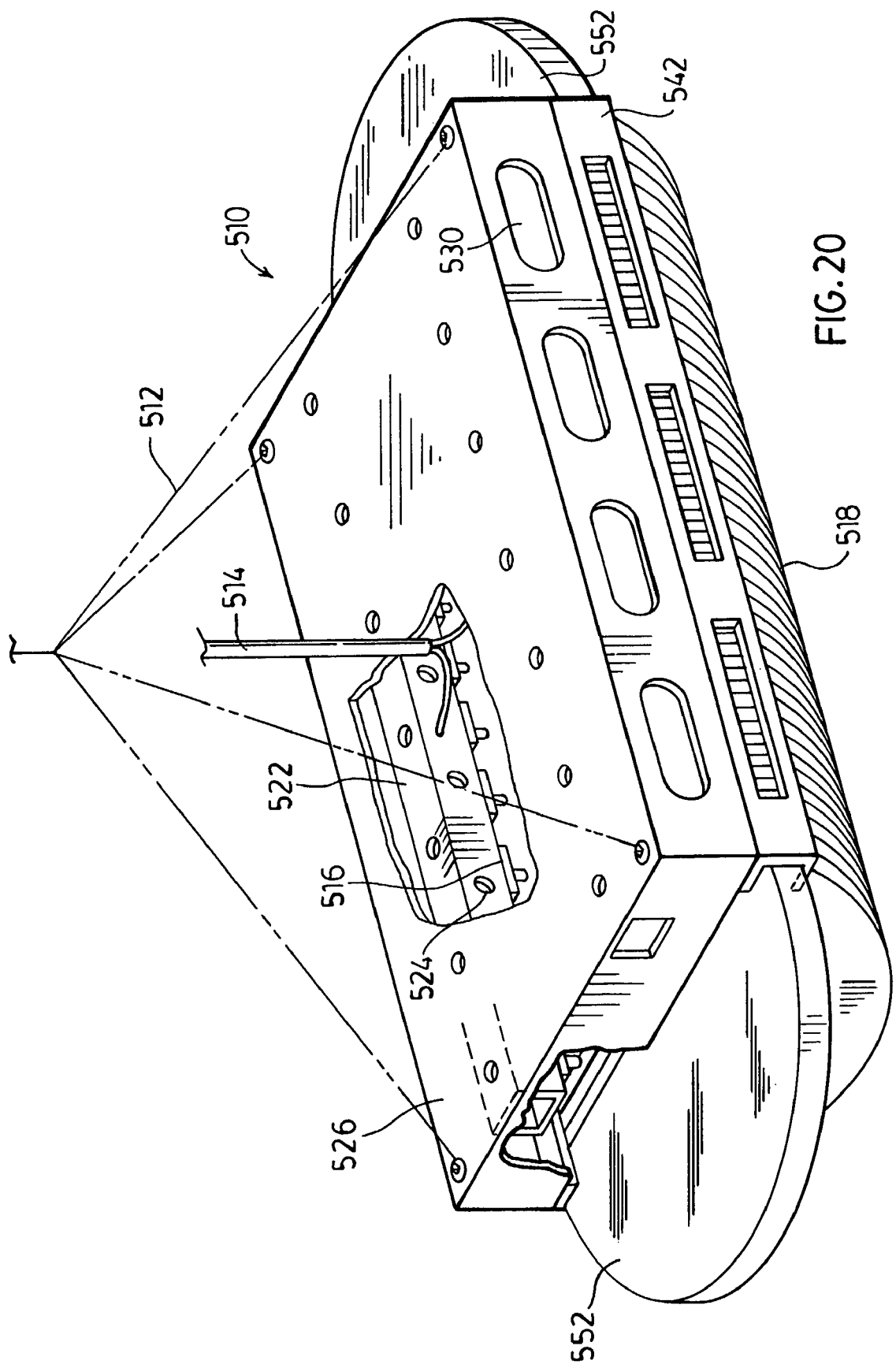
FIG. 20 is a perspective view partly in section of a seventh embodiment of a light fixture of the present invention.

A variation of this embodiment of a light fixture according to the present invention for use in replacing incandescent light bulbs is illustrated in FIG. 19 generally indicated by the numeral 410. The LED light bulb 410 is provided with a screw based interface 412 that fits into the standard screw fixtures. The light bulb 410 is provided with a LED light array 414 comprised of a plurality of individual LED's 416 which are attached to a circuit board 418 containing the control circuitry. A ceramic insert 418 is provided to act as a heat sink for the LED array. Overlaying the LED array is a cylindrical wave guide lens housing 420 which allows some of the light from the LED light array to pass straight through while deflecting other portions of the light sideways to provide for good overall illumination of the space lighted by the light fixture 410.

A seventh embodiment of the LED light fixture of the present invention for use in replacement of fluorescent light fixtures as illustrated in FIGS. 20 to 23 generally indicated by the numeral 510. The LED light fixture 510 illustrated in the figures is adapted to be suspended from a ceiling. A mounting bracket is attached to the ceiling over the electrical outlet box. The light fixture 510 is suspended from the bracket through the use of suitable suspension guy wires 512 and is connected to the electrical box by wire 514. Wire 514 is in turn connected to a power supply which supplies the power to the LED array assembly 516, the details of which will be described further below. The light from the LED array 516 passes through a diffuser system 518 to provide for even and uniform light output from the light fixture 510.

Figure 21:
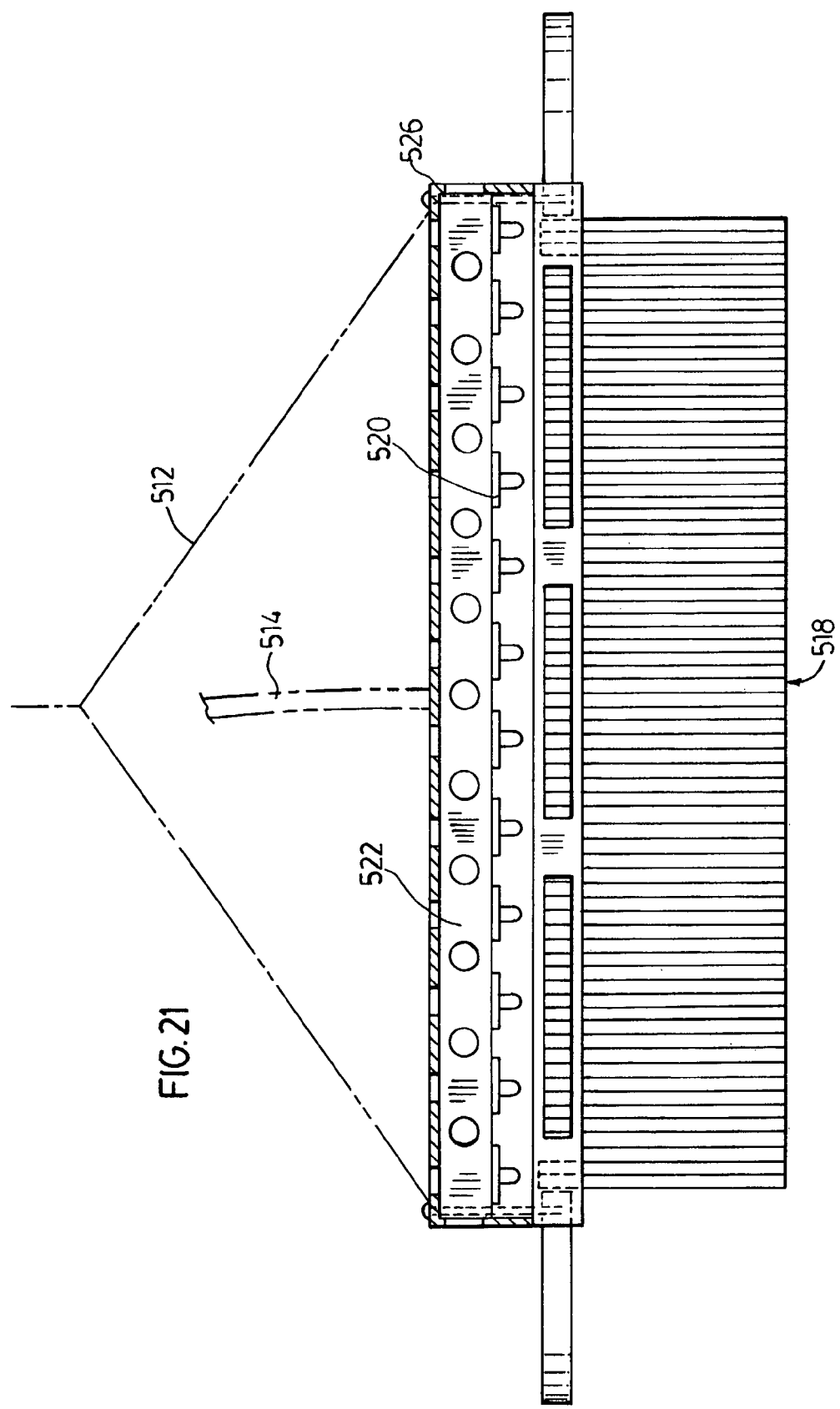
FIG. 21 is a side elevation view in cross section of the light fixture of FIG. 19.
Figure 22:
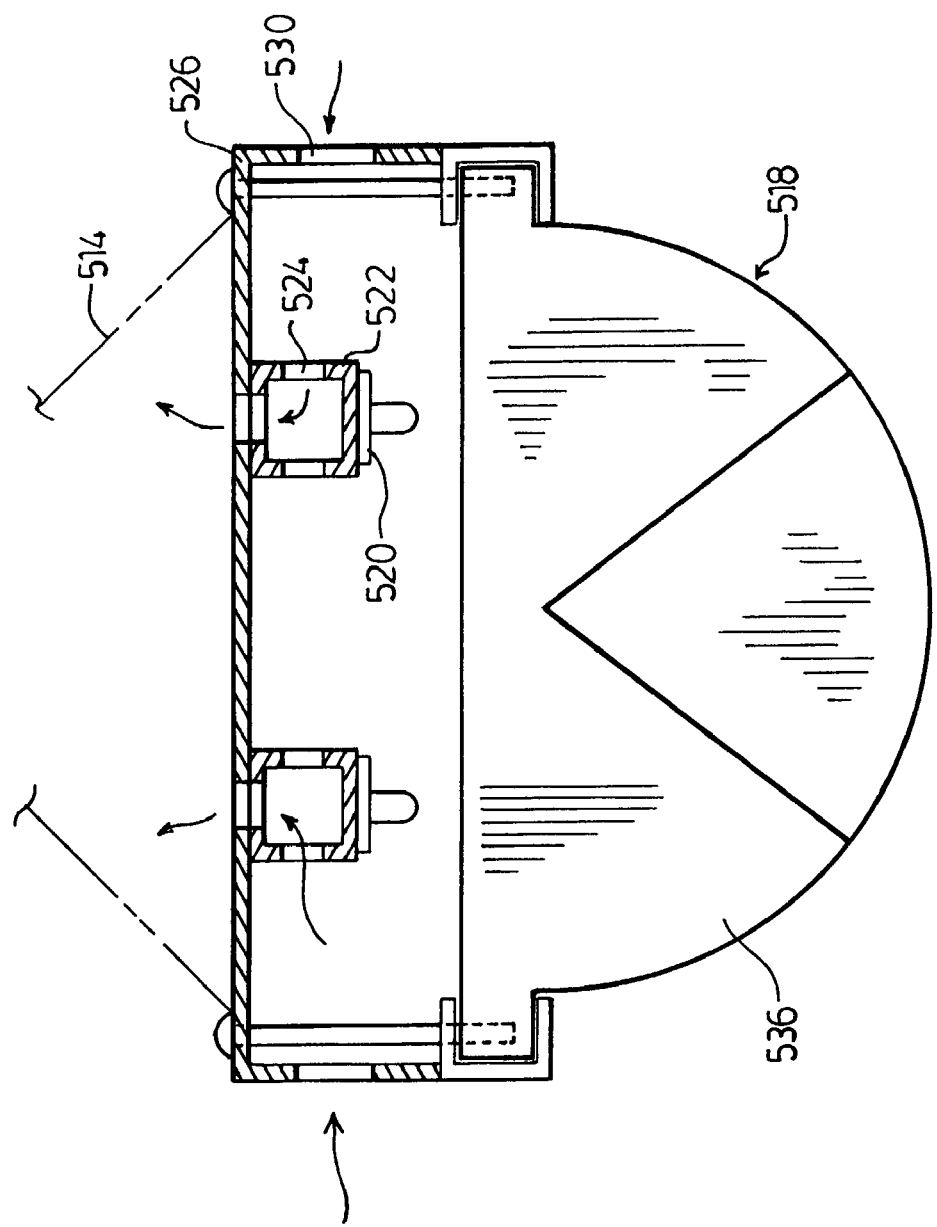
FIG. 22 is an end elevation view in cross section of the light fixture of FIG. 19.
Figure 23:
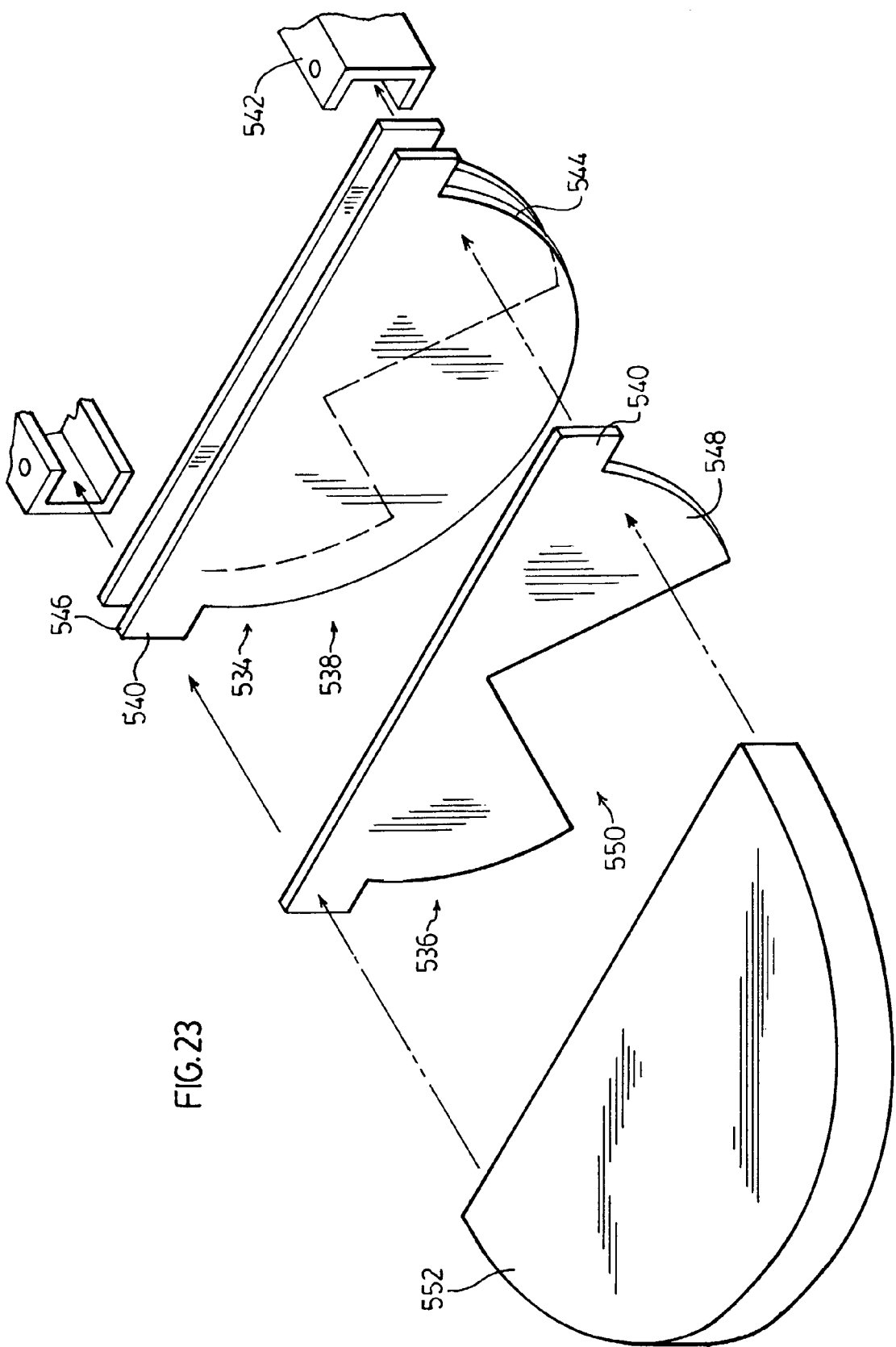
FIG. 23 is an exploded perspective view of the light diffuser of the light fixture of FIG. 19.

The details of the light components of this embodiment are illustrated in detail in FIGS. 21 and 22. The embodiment illustrated utilizes a chip based LED array 520. These chips 520 are provided with about 42 LED's per each chip and the light illustrated in the figures utilizes 14 such chips per side. The LED light array utilizes two parallel rows of LED chips 520 each independently fed by a power supply and controlled by a power controller. The LED chips 520 are mounted on a thermal core heat sink 522 which allows for the heat generated by the LED chips 520 to be dissipated into the atmosphere. The version of the heat sink 522 utilized in the embodiment illustrated is a metal tube 522 to which the LED chips 520 have been attached. The hollow metal tube 522 is provided with openings 524 along the top and sides thereof to allow for air flow through the tube 522 to aid in heat dissipation. The tubes 522 are contained within a casing 526 to which the light diffuser assembly 528 is attached. The casing 526 is provided with a labyrinth arrangement of holes 530 which allow for the proper air flow while minimizing dust infiltration as is illustrated in detail in FIG. 21.

In the fixture 510 illustrated in FIGS. 20 to 23, the light from the LED arrays 520 is directed downwardly into the light diffuser system 518. In the embodiment illustrated, the diffuser system 518 is a composite wave guide which provides for diffusion of the light from the LED arrays 520 along the entire surface of the wave guide. The composite wave guide is comprised of two types of individual elements 534 and 536 which are alternately stacked together to form the wave guide light diffuser 518.

Element 534 has a generally semicircular shape 538 with wings 540 extending to either side at the top of the element 534. The wings 540 allow the individual elements to be held within U channels 542 which are in turn connected to the casing 526. Element 534 allows for general diffusion of the light from the LED arrays 520 along the exposed surface 544 of the semicircular shape 538. The top surface 546 of element 534 allows for the light from the LED array 520 to enter into the interior of the element 534.

Element 536 is a semicircular shape 548 with a triangular cutout 550 extending upwardly from the bottom of the semicircular shape 548 and wings 540 extending to either side of the element at the top thereof to be held within the U channels 542. The angles of the triangular cutout 550 are selected to provide for total internal reflection of the light from the LED array 520 within element 536. The total internal reflection provides for light to be observed at the exposed surfaces of element 536 to provide a light effect.

The elements 534 and 536 are held within the U channel 542 by semi-circular end pieces 540 which extend outwardly and are light transparent to provide a further light projection.

Figure 24:
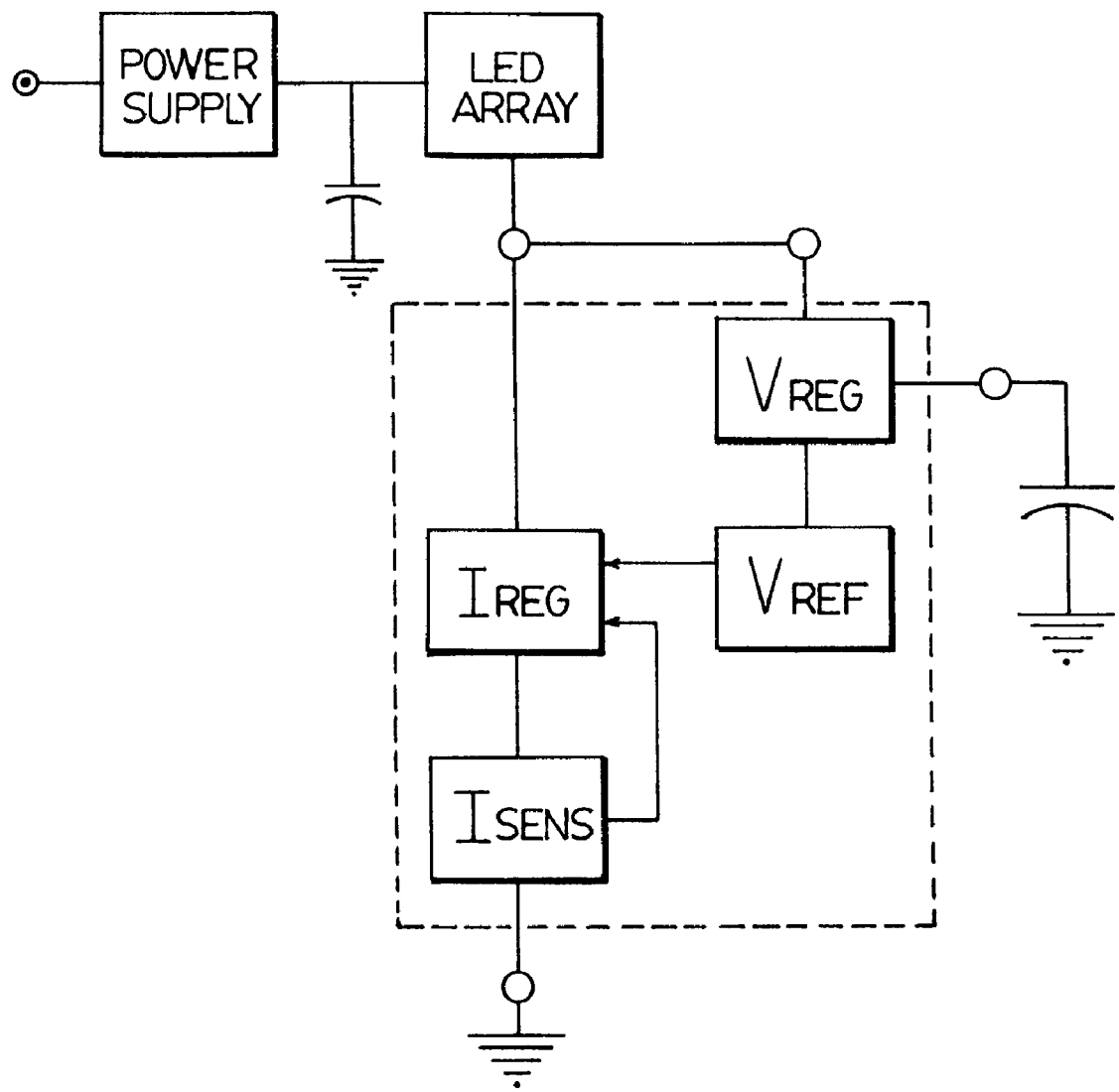
FIG. 24 is a circuit diagram of a preferred embodiment of the power control section of the present invention.

As described above, LED light fixture of the present invention utilizes the LED array as the ballast in the control system. Preferably the control system is an active bootstrap circuit where the dynamic resistance of the LED array is used as the bootstrap. In this way, the LED array in combination with the active bootstrap circuitry controls the power used by the LED array and ensures optimum light output under a wide range of ambient temperatures, as well as maximizing the life of the LED's. A block diagram of the active bootstrap circuitry of the preferred embodiment is illustrated in FIG. 24. Preferably, the LED light fixtures of the present invention are connected to the standard residential power such as 120 volts AC as is common in North America although other sources are also useable. A power supply is utilized to convert the 120 volts AC to a DC voltage of the desired level for the size of the LED array utilized in the light fixture. The output of the power supply is fed directly to the LED array which is configured to drop all of the voltage minus the small bootstrap voltage used by the active bootstrap circuitry. Thus for a 168 DC volt linear output and a bootstrap circuit using 5 DC volts, the LED array is designed to use 163 DC volts. In this way, most of the power is used by the LED array.

The LED array is thermally mapped and a dynamic resistance range is obtained. The bootstrap circuitry is connected to LED array and derives the bootstrap voltage from the low side of the LED array. The dynamic resistance of the LED array is used as the bootstrap source by the circuit. The bootstrap circuit has very low internal power requirements and 98% or more of the power is used by the LED array to produce light.

The active bootstrap circuit includes a voltage regulator Vreg to regulate the bootstrap voltage which is provided to Vref and used to set a reference voltage at a programmed predetermined fixed level to the current regulator Ireg. The predetermined voltage is selected based upon the LED array power range and range window size. The predetermined voltage is preferably selected to fall in the center of the LED array power range.

The bootstrap circuit also includes a current regulator to regulate the current flowing in the LED array to provide for the highest efficiency light output from the LED array. The current in the array is sensed by Isens which is programmed provides a control signal output to the current regulator Ireg. The output of Isens is programmed with reference to the LED array power range and is set to the center of the safe operating range of the array. The bootstrap range is very narrow and only accounts for a very small change in light output which is not visibly detectable and ensures that 98% or more of the power consumed by the LED array is used to produce light.

The sensed current signal from Isens along with the predetermined reference voltage from Vref are fed to the current regulator Ireg to control the current and hence the power of the LED array. If the sensed current from Isens drifts from the desired value, either as a result of changes in the resistance of the array or from noise in the supply voltage, Ireg actively adjusts the current flowing in the array to compensate and return the sensed value to the desired level. The response time for the adjustment is instantaneous, thus the power controller can immediately offset any fluctuations in the power levels of the LED array. This results in further power efficiencies and flicker free light output, as noise generated in the power supply or array are immediately cancelled out. By utilizing these feedback loops of sensed current and reference voltage, changes in the dynamic resistance of the LED array are actively detected, adjusted, and optimized for the highest power efficiency and light output. Thus the circuitry of the present invention overcomes the prior art problem where an LED array may run away, as the electrical characteristics of the LED change with increased temperature either from increased ambient temperature or heat generated by the LED array.

The present invention provides for LED light fixtures which can produce a light of a suitable intensity and colour for a task for which the fixture is to be used. For example, an LED light fixture in accordance with the third embodiment with selection of the proper LED will produce the equivalent lighting as that of a 40 watt fluorescent light fixture while utilizing significantly less power while providing for extending life between replacement as the life expectancy of an LED is 20 plus years in continuous use. The light fixtures of the sixth embodiment can be utilized for replacement of typical incandescent bulbs especially in indicator systems such as is used in subways to indicate that a section of the subway is powered as well as for block control to control the movement of the trains along the track, thus for indicating whether a section of the track is powered, the indicator bulb is generally blue while for the train control lighting typical red, amber and green lights are utilized by selection of the proper LED's these indicator lights are easily replaced. With the design of the sixth embodiment, it has been found that LED's drawing 5 watts will produce a similar light output as a 60 watt light bulb while achieving 90% electrical saving as well as significantly reduce maintenance costs as bulbs do not have to be replaced as frequently as typical incandescent bulbs. The light of this embodiment may also be utilized with a resetable fuse such as if some of the LED were to burn up, the fuse opens and then closes after a few seconds thus a flashing bulb indicates defective LED's and that the bulb needs to be replaced.

Although various preferred embodiments of the present invention has been described in detail, it would be appreciated by those skilled in the art that variations may be made thereto without departing from the spirit of the invention.

The embodiments of the invention in which an exclusive property or privilege is claimed are defined as follows:

1. An LED light fixture comprising an interface for connecting the fixture to a source of electrical power and providing power to an LED array producing a light of a suitable intensity and color, a power control section for controlling power in the LED array and a light diffuser for diffusing the light from the LED array, the power control section comprising an active bootstrap circuit connected to a low voltage side of the LED array, the active bootstrap circuit comprising a means for sensing current in the LED array and providing sensed current, which varies as a function of the dynamic resistance of the LED array, to a current regulator means to regulate current through said LED array to compensate for variations from a desired level caused by said dynamic resistance of said LED array.

2. An LED light fixture according to claim 1 wherein the light diffuser comprises an optical waveguide which provides for diffusion of the light from the LED array.

3. An LED light fixture according to claim 2 wherein the fixture includes a thermal core to which the LED array is thermally connected for thermal collection and dispersion of heat output of the LED array.

4. An LED light fixture according to claim 3 wherein the LED army comprises a mixture of LED bulbs providing a white light of a CRI of 85+.

5. An LED light fixture according to claim 4 wherein the interface is a screw base to allow the light fixture to replace a standard incandescent bulb.

6. An LED light fixture according to claim 5 wherein the thermal core comprises a ceramic disk sized to provide for the required dispersion of the heat output of the LED array.

7. An LED light fixture according to claim 6 wherein the light diffuser wave guide has a generally cylindrical exterior surface and a generally conical interior surface with the apex of the conical interior surface adjacent the LED array.

8. An LED light fixture according to claim 7 wherein the LED array comprises a plurality of LED bulbs arranged on the surface of the ceramic thermal core.

9. An LED light fixture according to claim 4 wherein the LED array comprises a plurality of LED bulbs arranged in an elongate rectangular pattern to imitate a standard fluorescent fixture.

10. An LED light fixture according to claim 9 wherein the light diffuser wave guide includes an elongate prism adjacent the LED array to reflect the light generally perpendicularly sideways.

11. An LED light fixture according to claim 10 wherein the light diffuser wave guide further includes a diffuser panel having a generally triangular aoss section with the base of the generally triangular cross section optically coupled to the elongate prism.

12. An LED light fixture according to claim 1 wherein the bootstrap circuit includes a means for providing a predetermined fixed reference voltage to the current regulator means.

13. An LED light fixture according to claim 12 wherein the interface for connecting the fixture to a source of electrical power includes a means of connecting to a source of AC and a linear non-switching power supply to supply DC directly to a high side of the LED array.

14. A high voltage LED light source comprising an LED array in series with a low voltage power control section for current regulation through said LED array;
   said LED array having sufficient LED's in series to form a combined high intensity light source and a voltage step down device producing a low voltage supply powering said low voltage power control section;
   said LED array having a dynamic resistance, said power control section comprising an active bootstrap circuit connected to a low voltage side of the LED array, the active bootstrap circuit comprising a means for sensing current in the LED array and providing the sensed current, which varies as a function of the dynamic resistance of the LED array, to a current regulator means to regulate current through said LED array to compensate for variations from a desired level caused by said dynamic resistance of said LED array.

* * * * *